UNITED STATES PATENT OFFICE.

EBENEZER C. WARNER, OF ALBANY, NEW YORK.

MODE OF MANUFACTURING HYDRAULIC CEMENT FROM BASANITE.

Specification forming part of Letters Patent No. 371, dated October 6, 1837.

*To all whom it may concern:*

Be it known that I, EBENEZER C. WARNER, of the city of Albany, in the State of New York, have discovered a new and useful Mode of Manufacturing Hydraulic Cement by the Employment of the Mineral called "Basanite Lydian Stone," and sometimes called "Touchstone;" and I do hereby declare that the following is a full and exact description of my said discovery.

To enable others to prepare the above material for use for the above purpose, I will describe its preparation.

The said mineral is to be burned in any convenient mass (in the manner of burning lime in kilns) in layers of wood and pit-coal, with the mineral on the top, to a red heat, which may be continued six or eight hours. After cooling, the said mineral is to be cracked, and then to be reduced to a fine powder and to as impalpable a powder as practicable, for which purpose it should be reduced to small fragments, to a convenient size for grinding, and then to be ground between millstones of the ordinary size and kind, or by any other process of pulverizing by which the material may be reduced. It is then to be mixed with water to a proper consistency for application to the purposes for which it is designed.

The said hydraulic cement thus prepared is similar in its qualities and for the uses of "Roman," (so called,) and being insoluble and indestructible in water and capable of resisting the action of and exposure to frost, thus becoming a paste cement or mortar for laying stone which is to be exposed to the action of water, a cement for cisterns or other reservoirs and aqueducts, and for securing cellars or other excavations below the surface of the ground which require to be secured against the admission of water.

The analysis of the mineral called "basanite lydian stone," and sometimes "touchstone," as ordinarily found, consists of the following proportions:

| | |
|---|---|
| Silex | 23 |
| Alumina | 15 |
| Potassa | 8 |
| Lime | .50 |
| Oxide of iron | 18 |
| Copper | 24 |
| Water, carbon, and loss | 11.50 |
| | 100 |

What I claim as my discovery, and desire to secure by Letters Patent, is—

A new and useful mode of manufacturing hydraulic cement by the employment of the mineral called "basanite lydian stone" and sometimes "touchstone," as a principal ingredient therein.

EBENEZER C. WARNER.

Witnesses:
R. JOHNSTON,
WM. W. FROTHINGHAM.